United States Patent
Angelstrand et al.

[15] 3,690,642
[45] Sept. 12, 1972

[54] MEANS FOR CONFINING A TRANSLATABLE MEMBER TO STRAIGHT LINE MOTION

[72] Inventors: Borje Angelstrand; Ragnar Mostrom; Henry Yngvesson, all of Jonkoping, Sweden

[73] Assignee: Saab-Scania Aktiebolag, Linkoping, Sweden

[22] Filed: Jan. 20, 1971

[21] Appl. No.: 107,972

Related U.S. Application Data

[62] Division of Ser. No. 854,147, Aug. 28, 1969.

[52] U.S. Cl. .................269/56, 269/60, 269/65, 269/285, 269/320

[51] Int. Cl. ..........B23q 1/18, B23q 3/18, B25b 1/24

[58] Field of Search.......269/56, 60, 61, 65, 285, 320

[56] References Cited

UNITED STATES PATENTS

| | | |
|---|---|---|
| 2,784,624 | 3/1957 | Plachecki..............269/285 X |
| 3,124,018 | 3/1964 | Gough..........................269/60 |
| 3,185,927 | 5/1965 | Margulis..................269/60 X |
| 3,337,732 | 8/1967 | Opocensky..............269/60 X |
| 3,552,254 | 1/1971 | Marczy..................269/320 X |
| 3,593,459 | 7/1971 | Kulischenko............269/56 X |
| 3,600,576 | 8/1971 | Carter.....................269/60 X |
| 3,638,933 | 2/1972 | Burnette.....................269/60 |

Primary Examiner—Wayne A. Morse, Jr.
Attorney—Ira Milton Jones

[57] ABSTRACT

In structure comprising a pair of elements, one movable in a straight path relative to the other, one of the elements is provided with a track having a true, flat master surface extending in the direction of motion and an oppositely facing generally flat and parallel surface. The other element has rollers on fixed axes engaging the master surface and rollers on yieldingly movable axes engaging the other surface to maintain the first mentioned rollers firmly engaged with the master surface.

4 Claims, 5 Drawing Figures

INVENTORS
Börje Angelstrand
Ragnar Moström
Henry Yngvesson 3,690,642

MEANS FOR CONFINING A TRANSLATABLE MEMBER TO STRAIGHT LINE MOTION

This application is a division of U.S. patent application Ser. No. 854,147, filed Aug. 28, 1969 in the names of Börje Angelstrand and Ragnar Moström.

This invention relates generally to means for constraining a movable element to move in a straight path having a desired orientation, and has utility, for example, in coordinate tables used to carry film to be scanned so that it can be shifted edgewise to bring any predetermined part of the film into alignment with a fixed axis normal to the plane of the film.

The above mentioned application describes in more detail the reasons for scanning photographic film taken in connection with bubble chamber experiments, and the apparatus used in obtaining data from such scanning, and it may be referred to for further details concerning an environment in which the invention can be advantageously employed. Suffice it to say here that the film to be scanned or read is in the form of long strips, each having on it numerous lengthwise adjacent photographs or frames. For convenience, each strip is normally coiled on a reel or spool and is fed through the scanner or reading machine, frame by frame, from a supply reel to a takeup reel.

Each frame of film to be analyzed may contain one or more sets of diverging tracks that signify events, along with numerous other lines that trace the paths of particles that did not take part in events and which are therefore not of interest.

Selection of each part of a frame of film to be scanned is accomplished, at least in part, with the aid of a human operator. As it scans the image on the film, an automatic reader produces signals corresponding to all tracks on the portion of the film being scanned. These signals are fed to a computer which in effect rejects signals corresponding to tracks not of interest and preserves data relating to events selected for analysis.

One type of information that the reading apparatus is required to obtain from the photographic record of an event is the exact location of the event in the bubble chamber space, as signified by the location on each photograph of the event of its vertex, that is, the junction of the diverging track lines which characterize the event. To obtain this data there must be provision in the machine for relative motion between the film and the scanning mechanism, so that the image of the vertex can be brought into exact coincidence with a defined axis of the scanning device, and the machine must also have measuring apparatus which is responsive to such motion to establish the location of the vertex by reference to a coordinate system in the machine that is related in a known manner to the coordinate system of the bubble chamber.

While reading machines have been proposed that provide for movement of the film relative to a stationary optical axis, they have not heretofore been completely successful, and it is thus a general object of this invention to provide apparatus which avoids the problems and overcomes the difficulties that characterized prior reading machines in which the film was moved.

More specifically, the film being read in a machine with a fixed optical axis passes flatwise across a horizontal film table that is horizontally movable in all directions. The film is lengthwise advanced across the film table frame by frame, from a supply reel at one side of the film table to a takeup reel at the other side thereof, and as each frame to be scanned is brought into register with an aperture in the table, the portions of the film adjacent to that frame are clamped flatwise to the table so as to be constrained to move horizontally with the table.

It is evident that the accurate taking of data from the film being scanned requires that the table to which the film is clamped be moved in truly straight lines along exactly perpendicular coordinate axes lying in the plane of the film, and it is another object of this invention to provide structure for constraining a table of the general character just described to motion along such straight and mutually perpendicular lines.

It is another and more specific object of this invention to provide mounting means for the elements of a coordinate table by which the same is guided for straight line motion along a pair of coordinate axes, and to provide means by which such guide means can be so adjusted as to insure that the paths of table motion are exactly in mutually perpendicular relation to one another.

With these observations and objects in mind, the manner in which the invention achieves its purpose will be appreciated from the following description and the accompanying drawings. This disclosure is intended merely to exemplify the invention. The invention is not limited to the particular structure disclosed, and changes can be made therein which lie within the scope of the appended claims without departing from the invention.

The drawings illustrate one complete example of a physical embodiment of the invention constructed according to the best mode so far devised for the practical application of the principles thereof, and in which.

Figure 1:
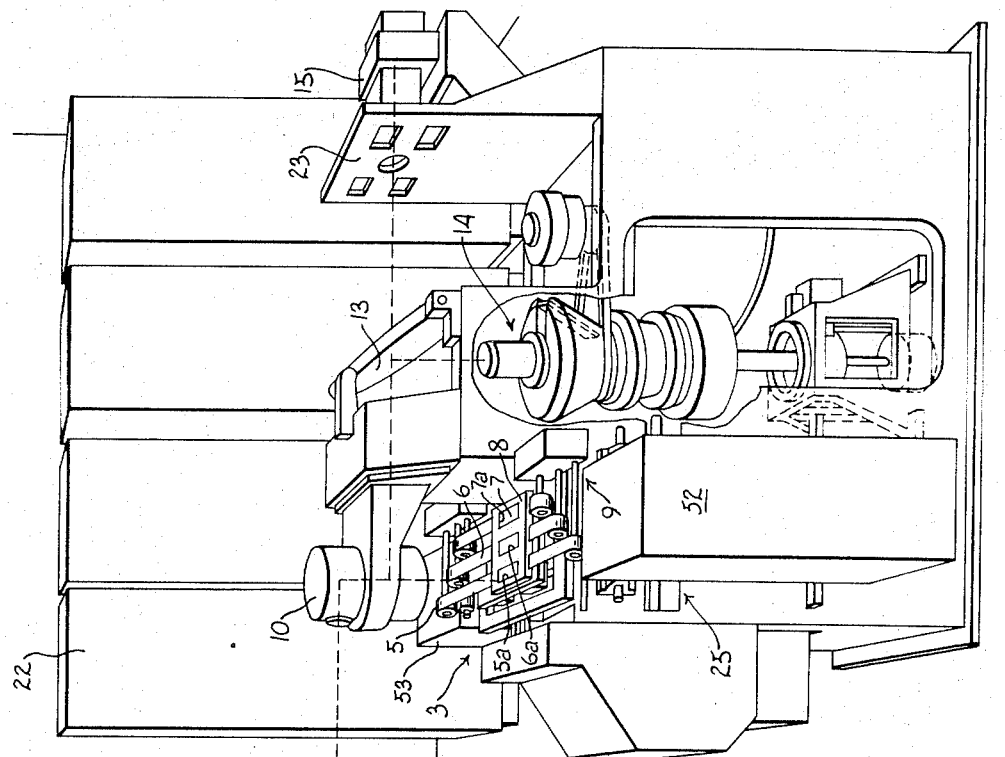
FIG. 1 is a general perspective view of reading apparatus embodying the principles of this invention.
Figure 1:
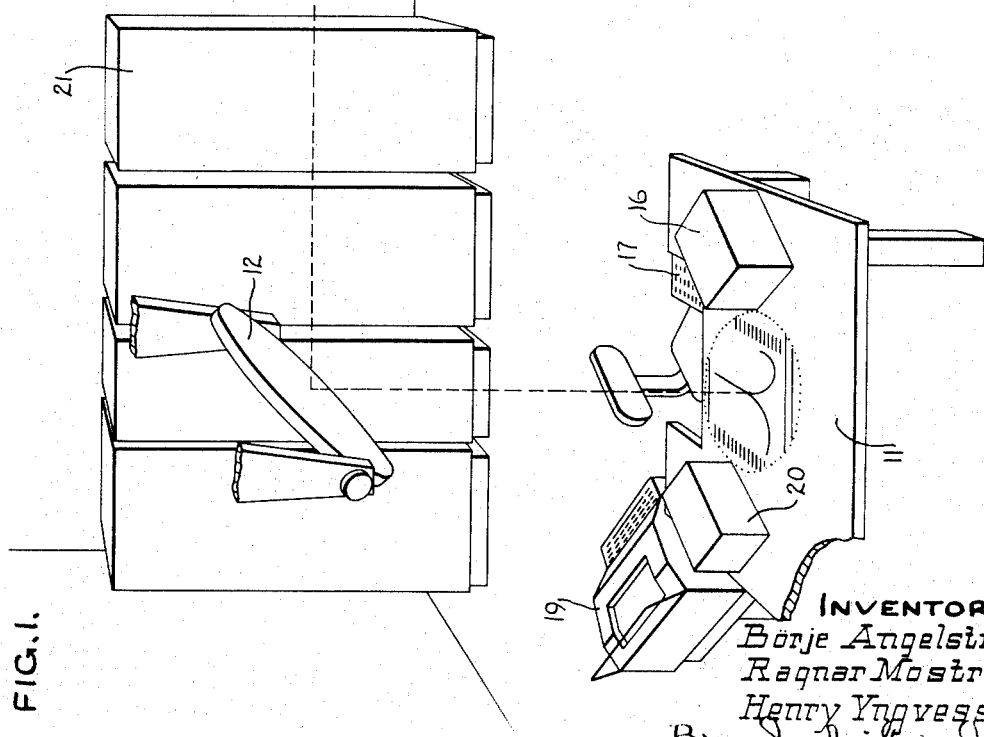

Referring now more particularly to the accompanying drawings, the numeral 3 designates generally a reading machine in which the present invention is embodied, and FIG. 1 illustrates it in its relationship to apparatus with which it cooperates.

The film to be analyzed or read by means of the reading machine 3 is in the form of long strips, each divided along its length into a number of frames, and each frame usually containing a record of one or more events which are of interest. To facilitate handling, each strip is normally wound onto a reel 4 to form a roll. Inasmuch as each experiment in a bubble chamber is photographed simultaneously by three cameras, three related rolls of film must be read more or less simultaneously, to coordinate data for each frame in each roll with that for the corresponding frames in the other two rolls. The frames in each roll are successively numbered before the film is presented to the reading machine 3, to facilitate identification of the recorded events.

In FIG. 1, three related strips of film to be scanned by the reading machine are respectively designated 5, 6 and 7. They extend across a horizontal table 8 on the reading machine having three apertures 5a, 6a, 7a, one for each strip, that can be brought into alignment with a suitable light source (not shown) which is located beneath the table. Film transport means, comprising a suitable capstan drive 9, provides for lengthwise advancing the strips of film simultaneously across the table 8, to permit successive frames on each strip to be brought into register with the apertures in the table for the purpose of scanning. As described hereinafter, the film table is capable of bodily movement in all horizontal directions to permit any selected portion of a frame of film to be brought into alignment with the optical axis of an objective head 10 which is fixed above the film table and which comprises reflecting means.

The film table is provided with remotely controllable clamping means (not shown), which can be actuated magnetically or by vacuum and by which portions of each film strip that are adjacent to a frame registering with an aperture in the table can be releasably flatwise clamped to the table to compel the film to move with the table.

The image on the film frame that is under the objective head is projected up into the objective head, thence horizontally in one direction, and finally down onto the top surface of an operator's table 11. An obliquely disposed mirror 12 above the operator's table receives the image from the objective head and reflects it downwardly onto the operator's table.

The image is also projected from the objective head in the opposite horizontal direction, toward a half-silvered mirror 13, whence it is reflected downwardly into a scanning device 14. The image is also projected through the half-silvered mirror into a television camera 15 which receives only a very small portion of the total image on a film frame, corresponding to about a square millimeter of the film around the axis of the objective head. The image of this small area is presented to the operator, in very greatly magnified form, on the screen of a television receiver 16 that is connected with the television camera. This highly magnified portion of the total image is used for accurately locating the film table to bring the vertex of the event record to be studied into exact coincidence with the axis of the objective head and hence into coincidence with the scanning axis of the scanning device 14.

On the operator's table there is a control console 17 for controlling film advance and the horizontal movements of the film table.

The scanning device 14 is connected with an electronic computer 21 through an adaptor 22 which is in itself a form of electronic computer. Further information concerning the scanning apparatus can be obtained from the above mentioned application. From even the brief description of the scanning device there given it will be evident that it would not be feasible to move the scanning mechanism to bring its axis into coincidence with the image of a vertex on the film; and therefore the present invention contemplates bodily movement of the film table 8 to allow the film to be carried to a position where such coincidence exists. It will be appreciated that the portion of the film that is being scanned must be compelled to partake of all horizontal motion of the table and that the table must be moved with precision in order to insure that data concerning its movements will accurately depict the location of the vertex on the film.

The table is supported on the top of a frame structure 25 which, as shown, can comprise a cabinet that houses the scanning device 14. To carry the table for horizontal motion in Y-directions, transverse to the length of the film, there is a movable carriage 26 upon which the table is mounted and which rides on rails 27 and 28 on the frame structure that extend in the Y-directions. Rails 29 and 30 on the top of the carriage, extending in the X-directions, parallel to the length of the film, constrain the table to move with the carriage in the Y-directions but guide the table for X-direction motions relative to the carriage.

The upper surfaces of the rails 27 and 28 that support and guide the carriage 26 are horizontal and flat. They are engaged by carriage supporting rollers 31 that are journaled on the carriage for free rotation on horizontal axes. Guidance of the carriage for precise linear motion in the Y-directions is provided by means of an upright longitudinal surface 32 on the rail 28, which surface is finished with special attention to insure that it will be accurately straight and flat and oriented exactly in the Y-directions. The surface 32 is engaged by rollers 33 on the carriage that have upright shafts 34 which are fixed on the carriage at locations spaced apart in the Y-direction but which are laterally adjustable relative to the carriage.

The opposite upright surface 35 on the rail 28, which can be considered a reaction surface, is made reasonably straight and parallel to the master guide surface 32. The reaction surface is engaged by rollers 36 which likewise have upright shafts 37, but these are secured to the carriage in a manner described hereinafter to be biased for yielding reaction between the carriage and the surface 35 by which the carriage is urged in the direction to maintain the rollers 33 engaged with the master guide surface 32.

Figure 3:
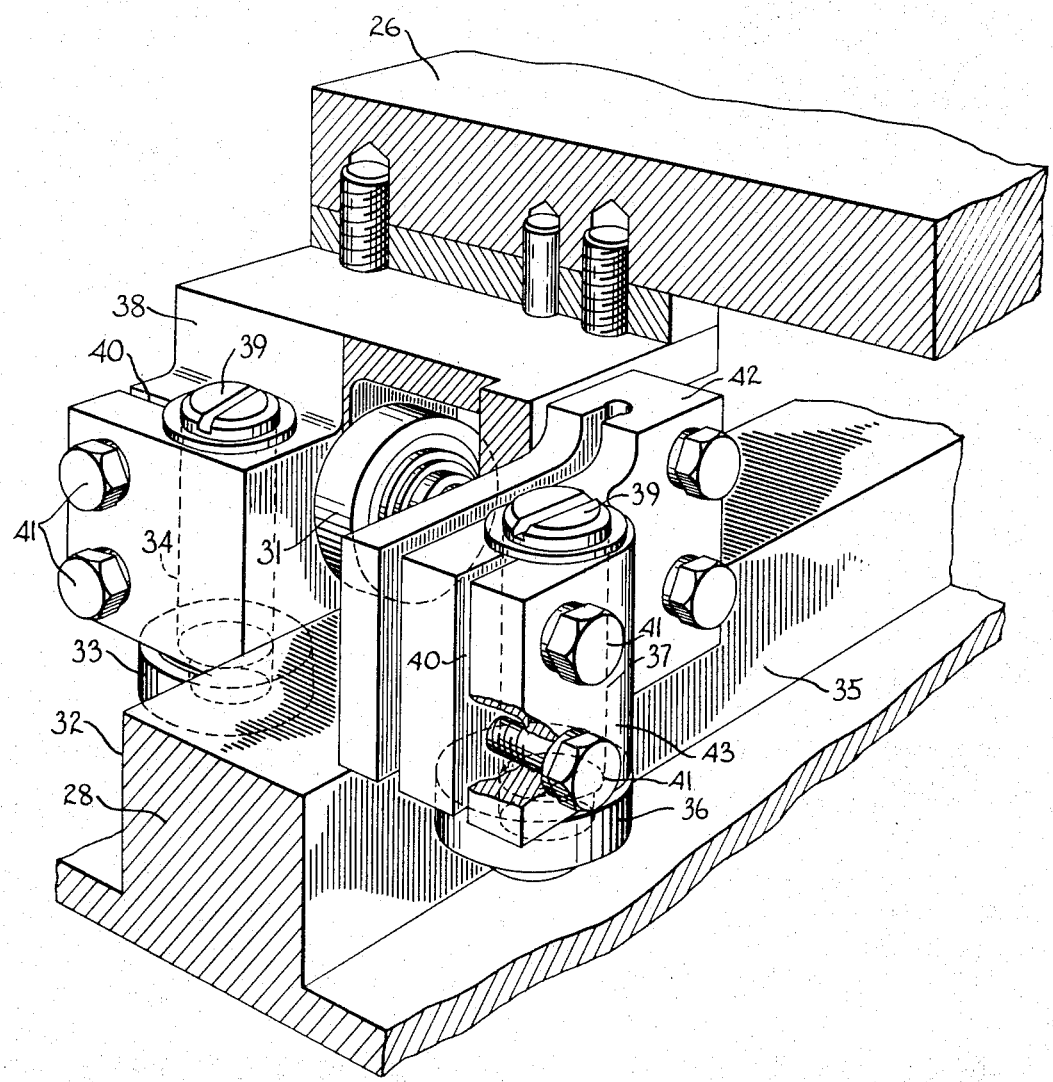
FIG. 3 is a fragmentary perspective view, on a still larger scale, showing the means by which the film table is mounted for motion in opposite directions.
Figure 4:
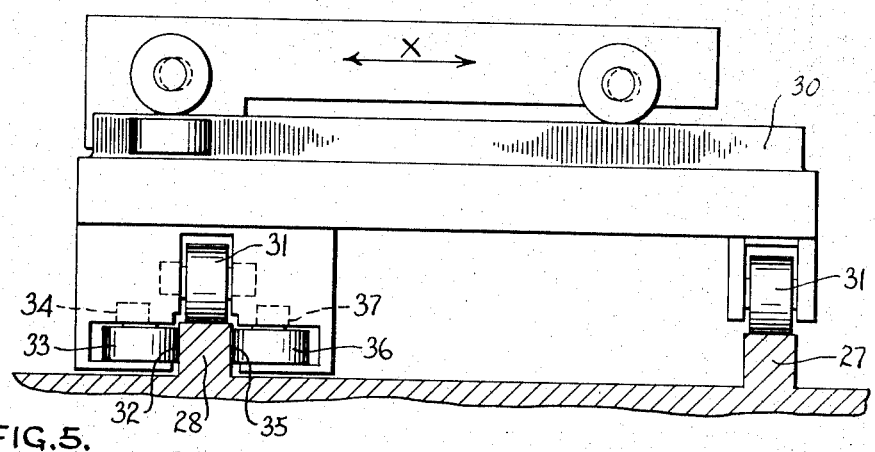
FIG. 4 is a more or less diagrammatic side elevation view of the film table and its carriage.
Figure 5:
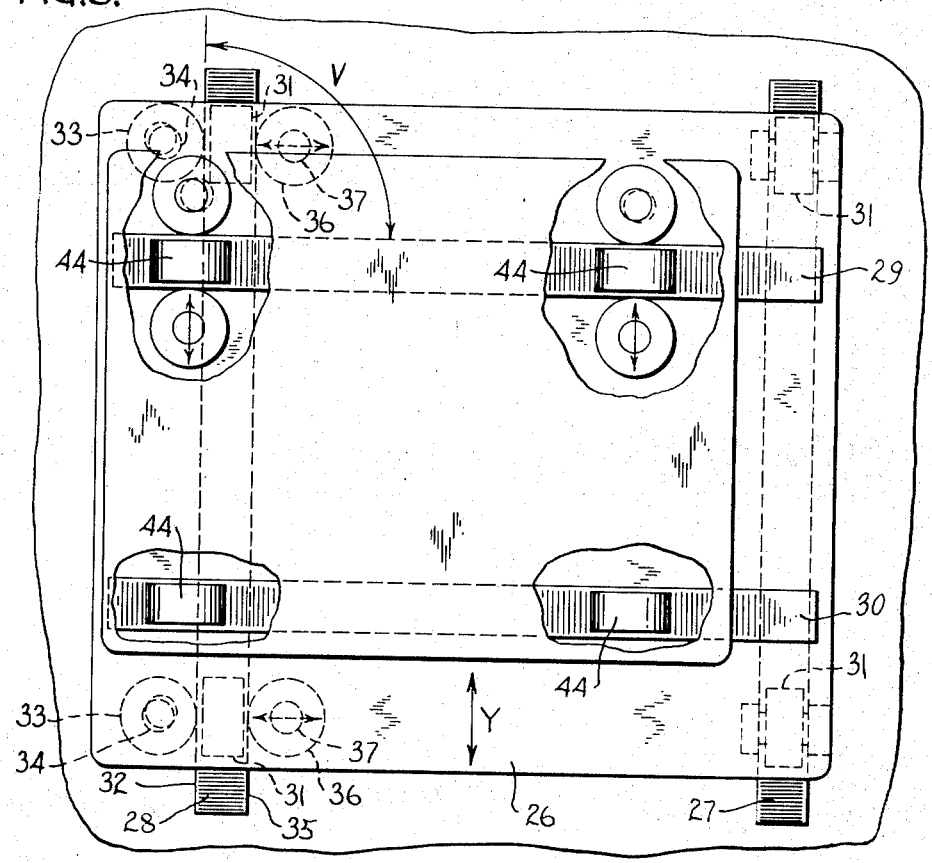
FIG. 5 is a plan view of the film table and its carriage, also somewhat diagrammatic, with portions shown broken away.

The shaft 34 for each of the rollers 33 that engage the master guide surface 32 is received in a blocklike holder 38 (see FIG. 3) that is rigidly secured to the carriage. Each shaft 34 has a cylindrical upper portion which is received in its holder 38 and a lower roller-journaling portion which is eccentric to its upper portion; hence rotation of the upper portion of the shaft carries the roller 33 for translatory adjustment relative to the carriage in the X-directions. To facilitate such adjustment each shaft can have a headed upper end portion 39 which projects above its holder and which is provided with a screw driver cross-slot. The block-like holder 38 in which each shaft is received can have a slot 40 that extends outwardly from its shaft receiving bore, and clamping screws 41 that extend transversely through the bifurcations defined by this slot can be tightened to hold the shaft in any position of rotational adjustment in which it may be established. The purpose of such adjustment of the shafts is to provide for so orienting the carriage that the X-direction table guide rail 29 thereon is exactly at a right angle to the Y-direction carriage guide rails 28, said right angle being designated by V in FIG. 5.

The shaft 37 for each roller 36 is received in a block-like clamping holder 43, but instead of being rigidly secured to the carriage, each holder 43 is formed on the free end of one leg of a resilient substantially U-shaped spring member 42. The other leg of the spring member, and its bight portion, are secured to the carriage with the legs under convergent bias by which the roller 36 is urged toward the reaction surface 35. Preferably the shafts 37 for the rollers 36 are formed like the roller shafts 34, with eccentrically offset upper and lower portions, and the holders 41 are likewise formed as clamping members by which the shafts 37 can be held in any desired position of rotational adjustment. Such adjustment of the shafts 37 varies the biasing force which the rollers 36 exert against the reaction surface 35, allowing that force to be established at a value high enough to assure maintenance of engagement between the rollers 33 and the master guide surface 32 but not so high as to entail resistance to easy motion of the carriage when the rollers 36 pass over any high spots on the reaction surface 35.

The table is provided with rollers 44 which rotate on horizontal axes and which ride on the top surfaces of the rails 29 and 30 on the carriage, and is also provided with rollers that rotate on upright axes and cooperate with master and reaction surfaces formed on one of those rails. The arrangement of the rollers on the table can of course correspond to that of the rollers on the carriage.

Preferably the horizontal shafts for the rollers 31 and 44 which respectively support the carriage and the table are formed with eccentrically offset securement and journal portions to provide for adjustments that will assure accurately horizontal orientation and motion of the table.

The carriage is driven for movements in the Y-direction by means of a Y-drive motor 46 which is mounted on the frame structure 25 and which has its shaft coaxially coupled with a lead screw 47 that extends in the Y-direction and is confined against axial motion. The lead screw cooperates with a female threaded element 48 that is anchored on the carriage. The table is similarly driven for X-direction movements relative to the carriage by means of an X-drive motor 49 that is mounted on the carriage and drives a coaxial lead screw 50 that extends in the X-direction.

The motors 46 and 49 are controllable from the operator's console 17 as well as by the computer mechanisms. It will be understood that suitable transducers (not shown) are associated with the carriage and with the table, respectively, to feed to the computer mechanism signals denoting the magnitudes and directions of table movements, which signals are used in conjunction with the output of the scanning device.

Carriers 52 and 53 for the supply and takeup reels 4 are mounted at opposite sides of the frame structure 25, spaced from the table in the X-directions. Each carrier accommodates the reels for the three film strips 5, 6 and 7 being processed through the machine and is vertically elongated, extending downwardly a substantial distance along one side of the frame structure with its top at about the level of the table and its bottom a substantial distance below the level of the carriage rails 27 and 28.

The reels are supported in each reel carrier for rotation on axes that extend in the Y-direction. Inside the carrier each film strip extends from its reel in a downward loop through a so-called vacuum buffer 55, comprising loop level detecting vacuum operated switches 56 that control the rotation of the film reels in accordance with the rate of film advance effected by the capstan drive 9. From the vacuum buffer the film is trained over rollers 57 which guide it upwardly out of the carrier and horizontally partway toward the table, thence around the roller of the capstan drive and again horizontally to the table.

For proper guidance of the film within each reel carrier, the reel is constrained against axial motion relative to the reel carrier; but to avoid twisting of the film each reel carrier as a whole is bodily moved in the Y-directions in unison with Y-direction movements of the table.

Each reel carrier is mounted for such movement by means of a shaft 59 which extends in the Y-directions and which is supported on brackets 60 that project inwardly from the side surface of the reel carrier 52. Ball bushings 61 on the frame structure 25 surround the shaft to mount the reel carrier and the shaft for motion along the frame structure and also permit the reel carrier to swing freely about the axis of the shaft. Since the ball bushings 61 are located above the center of gravity of the reel carrier, and are spaced from its center of gravity in the direction toward the adjacent side of the frame structure, the bottom of the reel carrier tends to swing inwardly toward said side of the frame structure. The limit of such swinging motion is defined by a rail 62 on the side of the frame structure extending in the Y-directions, spaced a distance below the shaft 59 and having a flat outwardly facing surface, which surface is engaged by rollers 63 on the reel carrier. It will be evident that this mounting arrangement for each reel carrier provides for easy motion thereof in exactly the desired directions without involving manufacturing problems and complications.

Figure 2:
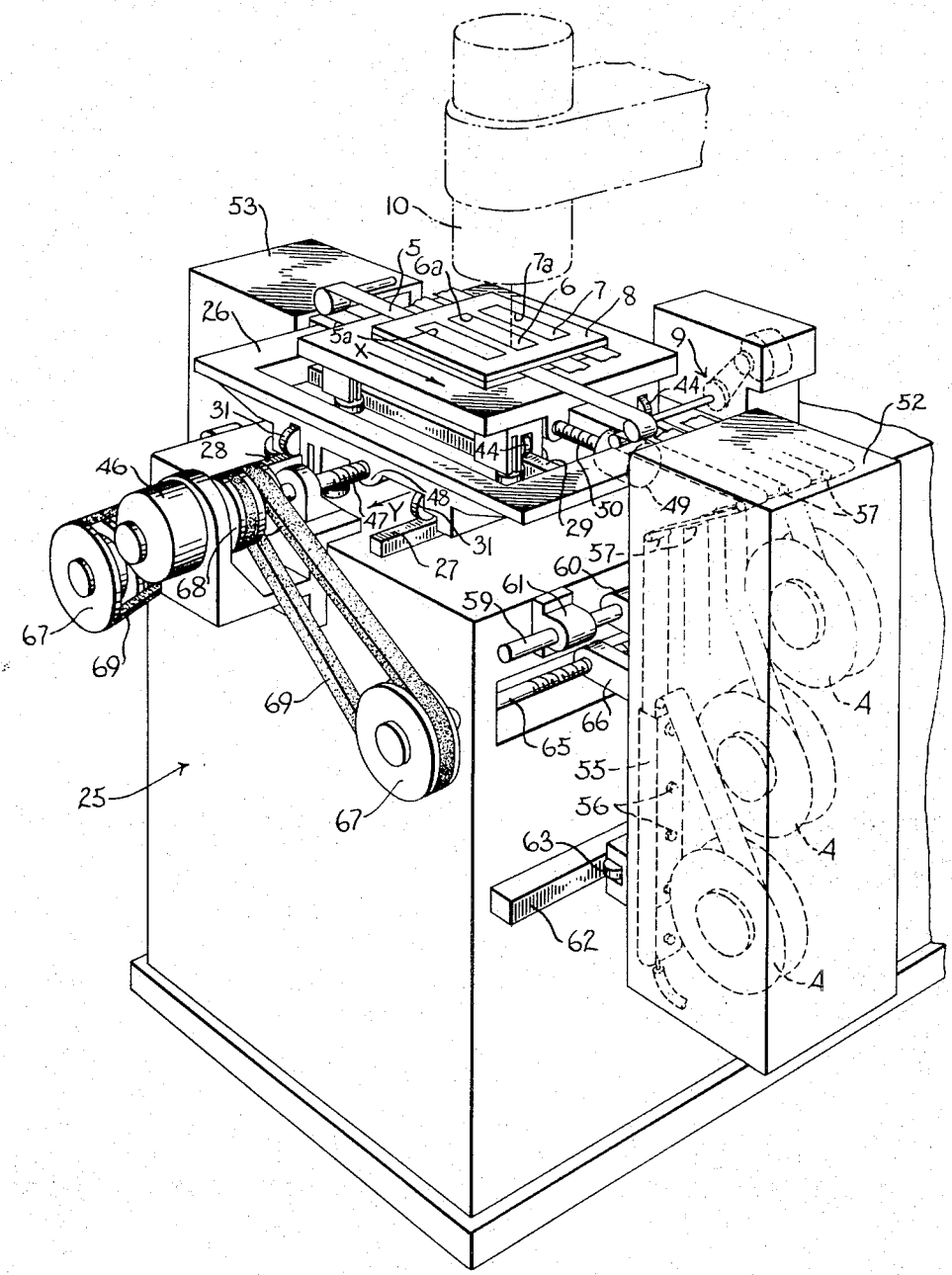
FIG. 2 is a perspective view on a larger scale of the film moving mechanism of this invention.

Each reel carrier is constrained to move in unison with the table in the Y-directions by means of drive means for the reel carriers that are synchronized with the drive means by which the carriage 26 is moved. As shown in FIG. 2, there is a lead screw 65 for each reel carrier that extends in the Y-directions and is journaled in the frame structure and constrained to rotation. Cooperating with each lead screw is a female threaded element or nut 66 that is so mounted on the reel carrier as to be confined against rotation but to constrain the reel carrier to move in unison with it in the Y-directions while providing for limited swinging motion of the reel carrier relative to it.

Each of the reel carrier driving lead screws 65 has a pulley 67 on its projecting outer end portion, and there is a double pulley 68 on the shaft of the Y-drive motor 46. Toothed belts 69 connect the driving pulley 68 with the respective pulleys 67 on the lead screws 65 and thus drive the reel carriers in the Y-directions in synchronism with Y-direction motion of the film table.

From the foregoing description taken with the accompanying drawings it will be apparent that this invention provides a film carrying table or the like having elements constrained to straight line motion relative to one another and having simple means for adjusting the angular relationship of the paths of linear motion of such elements.

Those skilled in the art will appreciate that the invention can be embodied in forms other than as herein disclosed for purposes of illustration.

The invention is defined by the following claims:

1. In a machine for analyzing photographic and similar records to derive quantitative data therefrom, having a table member and means for releasably securing a record to the table member in a predetermined position thereon, by which table member the record can be moved edgewise to bring any selected point on the record into coincidence with a fixed reference axis transverse to the plane of the record, means for constraining the table member to motion along coordinate axes that are perpendicular to one another and to said reference axis so that the location of a selected point on the record can be determined by the distance the table member is moved along each of said coordinate axes, the last mentioned means comprising:

A. fixed means on the machine defining
  1. a pair of first supporting surfaces, each lying in a plane transverse to the reference axis and extending parallel to one of said coordinate axes, said first surfaces being spaced apart in the direction of the other coordinate axis,
  2. a first elongated master surface which lies in a plane substantially parallel to the reference axis and extends lengthwise parallel to said one coordinate axis, and
  3. a first elongated reaction surface substantially parallel to said first master surface but facing in the opposite direction;
B. a carriage member for movement in directions parallel to said one coordinate axis;
C. means fixed on the carriage member defining
  1. a pair of second supporting surfaces, each lying in a plane transverse to the reference axis and extending lengthwise parallel to the other coordinate axis, said second supporting surfaces being spaced apart in the direction of the first mentioned coordinate axis,
  2. a second elongated master surface which lies in a plane substantially parallel to the reference axis and extends lengthwise parallel to said other coordinate axis, and
  3. a second elongated reaction surface substantially parallel to said second master surface but facing in the opposite direction;
D. a plurality of pairs of rollers, one pair engaging each of said surfaces; and
E. means mounting said rollers on said members with the two rollers of each pair spaced apart lengthwise of the surface which the same engage,
  1. the means mounting the rollers that engage said pairs of supporting surfaces providing for rotation thereof on axes fixed on the respective members,
  2. the means mounting the rollers that engage the master surfaces providing for individual adjusting movement of the axes of said rollers in directions transverse to the master surfaces that they respectively engage to provide for orienting the second master surface accurately perpendicular to the first master surface, and to enable adjustment of the table member to a desired orientation, and
  3. the means mounting the rollers that engage said reaction surfaces comprising biasing means reacting between the respective members and reaction surfaces in the directions to maintain engagement of the master surfaces by their rollers.

2. The machine of claim 1 further characterized by:
the means mounting the rollers that engage said pairs of supporting surfaces providing for adjusting individual movement of the axes of said rollers in directions parallel to said reference axis to provide for orientation and motion of a record on the table member in a plane accurately perpendicular to the reference axis.

3. In a machine having a table member with a workpiece supporting face and which is intended to be moved edgewise to bring any selected point on its said face into coincidence with a fixed reference axis transverse to the plane of said face, means for constraining the table member to motion along coordinate axes that are at a desired angle to one another and mutually perpendicular to said reference axis so that the location of a selected point on said face can be determined by the distance the table member is moved along each of said coordinate axes, the last mentioned means comprising:

A. fixed means on the machine defining
  1. a pair of first supporting surfaces, each lying in a plane transverse to the reference axis and extending parallel to one of said coordinate axes, said first surfaces being spaced apart in the direction of the other coordinate axis,
  2. a first elongated master surface which lies in a plane substantially parallel to the reference axis and extends lengthwise parallel to said one coordinate axis, and
  3. a first elongated reaction surface substantially parallel to said first master surface but facing in the opposite direction;
B. a carriage member for movement in directions parallel to said one coordinate axis;
C. means fixed on the carriage member defining
  1. a pair of second supporting surfaces, each lying in a plane transverse to the reference axis and extending lengthwise parallel to the other coordinate axis, said second supporting surfaces being spaced apart in the direction of the first mentioned coordinate axis,
  2. a second elongated master surface which lies in a plane substantially parallel to the reference axis and extends lengthwise parallel to said other coordinate axis, and
  3. a second elongated reaction surface substantially parallel to said second master surface but facing in the opposite direction;
D. a plurality of pairs of rollers, one pair engaging each of said surfaces; and
E. means mounting said rollers on said members with the two rollers of each pair spaced apart lengthwise of the surface which the same engage,
  1. the means mounting the rollers that engage said pairs of supporting surfaces providing for rotation thereof on axes fixed on the respective members,
  2. the means mounting the rollers that engage the first master surface providing for individual adjusting movement of the axes of said rollers in directions transverse to said master surface to provide for orienting the second master surface accurately at a desired angle to the first master surface, and 3. the means mounting the rollers that engage said reaction surfaces comprising biasing means reacting between the respective members and reaction surfaces in the directions to maintain engagement of the master surfaces by their rollers.

4. The machine of claim 3 further characterized by:
the means mounting the rollers that engage said pairs of supporting surfaces providing for adjusting individual movement of the axes of said rollers in directions parallel to said reference axis to provide for orientation and motion of workpiece on the table member in a plane accurately perpendicular to the reference axis.

* * * * *